(12) United States Patent  
Peterson et al.

(10) Patent No.: US 8,205,893 B2
(45) Date of Patent: Jun. 26, 2012

(54) VARIABLE CHASSIS ADJUSTMENT SYSTEM

(75) Inventors: John Peterson, Jackson, MN (US); John Buschena, Jackson, MN (US); Casey Steffensen, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 269 days.

(21) Appl. No.: 12/579,712

(22) Filed: Oct. 15, 2009

(65) Prior Publication Data

US 2011/0089647 A1    Apr. 21, 2011

(51) Int. Cl.
*B60G 17/00* (2006.01)
(52) U.S. Cl. ..................................... 280/6.157
(58) Field of Classification Search .............. 280/5.514, 280/43.17, 6.15, 6.155, 6.157, 638, 678; 180/900
See application file for complete search history.

(56) References Cited

U.S. PATENT DOCUMENTS

| 3,236,324 | A | | 1/1964 | Levratto |
| 4,619,340 | A | | 10/1986 | Elmer |
| 5,046,579 | A | * | 9/1991 | Anderson ..................... 180/340 |
| 5,704,959 | A | | 1/1998 | Lisec |
| 5,913,525 | A | * | 6/1999 | Schneider et al. ......... 280/6.153 |
| 6,257,361 | B1 | | 7/2001 | Dickson |
| 6,454,294 | B1 | | 9/2002 | Bittner |
| 7,029,014 | B2 | * | 4/2006 | Hamm ...................... 280/5.502 |
| 7,837,207 | B2 | * | 11/2010 | Kremmin et al. ......... 280/43.22 |
| 7,926,820 | B2 | * | 4/2011 | Taneda et al. .............. 280/5.508 |

* cited by examiner

*Primary Examiner* — Paul N Dickson
*Assistant Examiner* — Robert A Coker (57) ABSTRACT

In an example embodiment, an adjustment apparatus for varying the ground clearance of a vehicle includes an adjustable leg configured to couple to a chassis and wheel of a vehicle, and a removable stop to releasably fix the adjustable leg in a desired condition. The adjustable leg may include a main leg and a drop leg that is movable within the leg, the main leg configured to couple to a chassis of a vehicle and the drop leg configured to couple to a vehicle wheel.

4 Claims, 10 Drawing Sheets

VARIABLE CHASSIS ADJUSTMENT SYSTEM

FIELD OF THE INVENTION

The present invention relates to a vehicle adjustment system and, more particularly, to an adjustment system for moving a chassis of a vehicle up and down to adjust the vehicle's ground clearance and overall height.

DESCRIPTION OF RELATED ART

An agricultural vehicle may have drive wheels configured to pass between different crop rows in a field and a sprayer boom that extends outwardly from the vehicle to spray various crop areas. In order to avoid damaging the crops as the vehicle moves through the field, it is advantageous that the vehicle have sufficient ground clearance (the distance between the vehicle body and the surface over which it moves) to clear the crops.

While a standard height agricultural vehicle may be used to process short crops, such as early stage cotton or the like, difficulties arise when processing taller crops, such as mature corn, that are taller than the ground clearance of a standard vehicle. For such crops, high clearance vehicles may be used. But while a high clearance vehicle may provide sufficient clearance to pass over the top of taller crops, they raise a host of other issues. For example, high clearance vehicles, such as those that provide a crop clearance of 80 inches or more, generally have an overall height that exceeds highway height restrictions, thereby making the transport of such vehicles to and from the field difficult. For example, public highways often restrict the height of a load to 12 feet or less which is typically exceeded when a high clearance vehicle is placed on a transport trailer. Thus, the tires of a high clearance vehicle often must be deflated in order to lower the vehicle to an acceptable transport height.

Another problem associated with high clearance vehicles is their instability on rolling terrain. In addition, while a high clearance vehicle may be desirable for use on tall crops, they are not as effective in processing shorter crops without added complexity in the boom lifting mechanism to accommodate the range of motion required to place the boom at the proper height above the crop when spraying at the various crop heights. Some systems have been developed to increase the ground clearance of an existing vehicle. But these systems are typically complicated and require the removal of existing vehicle equipment and/or the addition of new equipment, such as wheel leg extensions and/or a hydraulic cylinders or the like to adjust and maintain the vehicle height. Furthermore, these systems are generally not capable of readily adjusting the vehicle to a variety of different ground clearances in the field, and/or must stay in a fixed height position for an extended period of time thereby limiting their usefulness in fields having crops of varying height. In addition, such systems are not readily adjustable in the field by a user, and require external lifting devices, and/or specialized tools.

What is needed is an adjustment system to vary the ground clearance and the height of a vehicle to enable the vehicle to be easily transported to and from the field, adjusted for use on crops of different heights, and customized for use with different terrain.

OVERVIEW

In an example embodiment, an adjustment apparatus is configured to couple to a chassis and a wheel of a vehicle and vary the distance between the chassis and the wheel to adjust the ground clearance and overall height of the vehicle. The adjustment apparatus may comprise an adjustable leg that is configured to couple to the chassis and the wheel of a vehicle, and a removable stop for fixing the length of the adjustable leg and thereby fix the distance between the chassis and the wheel. For example, the adjustable leg may be extended and retracted to position the chassis relative to the wheel to change the ground clearance of the vehicle and the vehicle's overall height. The removable stop may be configured to releasably engage the leg to fix the vehicle at a desired height and/or ground clearance. An example embodiment of a variable chassis vehicle comprises a chassis, a wheel, and the adjustment apparatus for adjusting the relative position of the chassis and the wheel to adjust the ground clearance and height of the vehicle.

The adjustment apparatus allows an operator to easily adjust the overall height of the vehicle and its ground clearance as desired, such as adjusting the vehicle height for transport, adjusting the ground clearance of the vehicle for processing crops of different heights, and adjusting the vehicle height in accordance with the terrain over which the vehicle is used. For example, in a typical scenario, the adjustment system may be used to lower the vehicle to a desired overall transport height to transport the vehicle to the field. An operator may then adjust the ground clearance of the vehicle in the field in response to the height of the crops to be processed. The operator may also adjust the height and ground clearance of the vehicle in the field to accommodate the particular terrain, such as lowering the vehicle over rolling terrain to provide increased stability. Upon completion of the work, the adjustment system may be used to lower the vehicle to a suitable transport height for transporting the vehicle from the field.

In an example embodiment, the adjustable leg includes a main leg and a drop leg movable with respect to the main leg. The main leg may be coupled to a chassis of a vehicle and the drop leg attached to a wheel of the vehicle, such as through a drive assembly, so that movement of the drop leg with respect to the main leg moves the chassis with respect to the wheel. In an example embodiment, the main leg serves as an open-ended sleeve within which the drop leg is movably positioned. The adjustable leg may be adjusted by extending and retracting the drop leg from the housing of the main leg to thereby adjust the relative position of the chassis and the wheel of the vehicle, which results in a change in the ground clearance and height of the vehicle. The drop leg may be configured to receive a removable stop, and the main leg configured to engage the removable stop to prevent further retraction of the drop leg through the main leg and thereby maintain the ground clearance and height of the vehicle. The removable stop may be sized to allow further extension of the drop leg, however, to allow an increase in the ground clearance and height of the vehicle. The removable stop may then be moved from its initial position to a new position to fix the adjustable leg in a desired condition.

In an example embodiment, the removable stop may be in the form of a wedge-shaped body with a protrusion configured for insertion through an aperture in the drop leg and an angled engaging surface for engaging the main leg. In an example embodiment, the main leg may have a hollow elongated housing with open ends to allow the drop leg to extend therethrough, a support member for coupling to a cross member of a vehicle chassis, and a skirt that defines a receiving area for receiving and engaging the angled engaging surface of the wedge. The drop leg may be movably housed within the main leg housing and have an elongated housing with a mount configured for mounting the drive assembly of a vehicle. The drop leg may be moved to a desired position relative the main leg to increase or decrease the distance between the chassis to which the main leg is coupled and a wheel of the vehicle to which the drop leg is coupled via the drive assembly.

The drop leg may be provided with a plurality of apertures to receive a protrusion of the removable stop in a variety of different positions along the leg. The receiving areas of the main leg may engage the angled surface of the stop to produce a clamping load on the wedge that assists in holding the arrangement together, maintain the removable stop in the drop leg, and prevent twisting. This arrangement allows an operator to adjust the overall height of the machine and its ground clearance in the field with a few simple hand tools without external lifting or support apparatus.

A power mechanism may also be provided to assist the positioning of the main leg and drop leg relative one another. For example, a hydraulic cylinder may be installed within the drop leg and coupled to the drop leg and the main leg to provide a force to extend or retract the drop leg and position the drop leg with respect to the main leg. These and other objects, features, and advantages of the present invention will become more apparent upon reading the following specification in conjunction with the accompanying drawing figures.

DETAILED DESCRIPTION

As required, example embodiments of the present invention are disclosed. The various embodiments are meant to be non-limiting examples of various ways of implementing the invention and it will be understood that the invention may be embodied in alternative forms. The present invention will be described more fully hereinafter with reference to the accompanying drawings in which like numerals represent like elements throughout the several figures, and in which example embodiments are shown. The figures are not necessarily to scale and some features may be exaggerated or minimized to show details of particular elements, while related elements may have been eliminated to prevent obscuring novel aspects. The specific structural and functional details disclosed herein should not be interpreted as limiting, but merely as a basis for the claims and as a representative basis for teaching one skilled in the art to variously employ the present invention. For example, while the exemplary embodiments are discussed in the context of an agricultural vehicle, and more specifically a sprayer vehicle, it will be understood that the present invention is not limited to that particular arrangement. Furthermore, the system described hereinafter as an adjustment system can also find utility as a system for other applications, beyond that of a mobile asset or vehicle.

Though various directional terms, such as such as "up", "down", "right" and "left", may be used herein based on the figures, one skilled in the art would appreciate that these terms relate to movement in the same plane. That is to say that the present invention contemplates movement at vertical, horizontal, and angled trajectories, as desired. Thus, when such terms as "up" and "down" are used herein, they are only example embodiments and are meant to identify movement in opposite directions in the same plane.

The materials described hereinafter as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the development of the invention.

Figure 1:
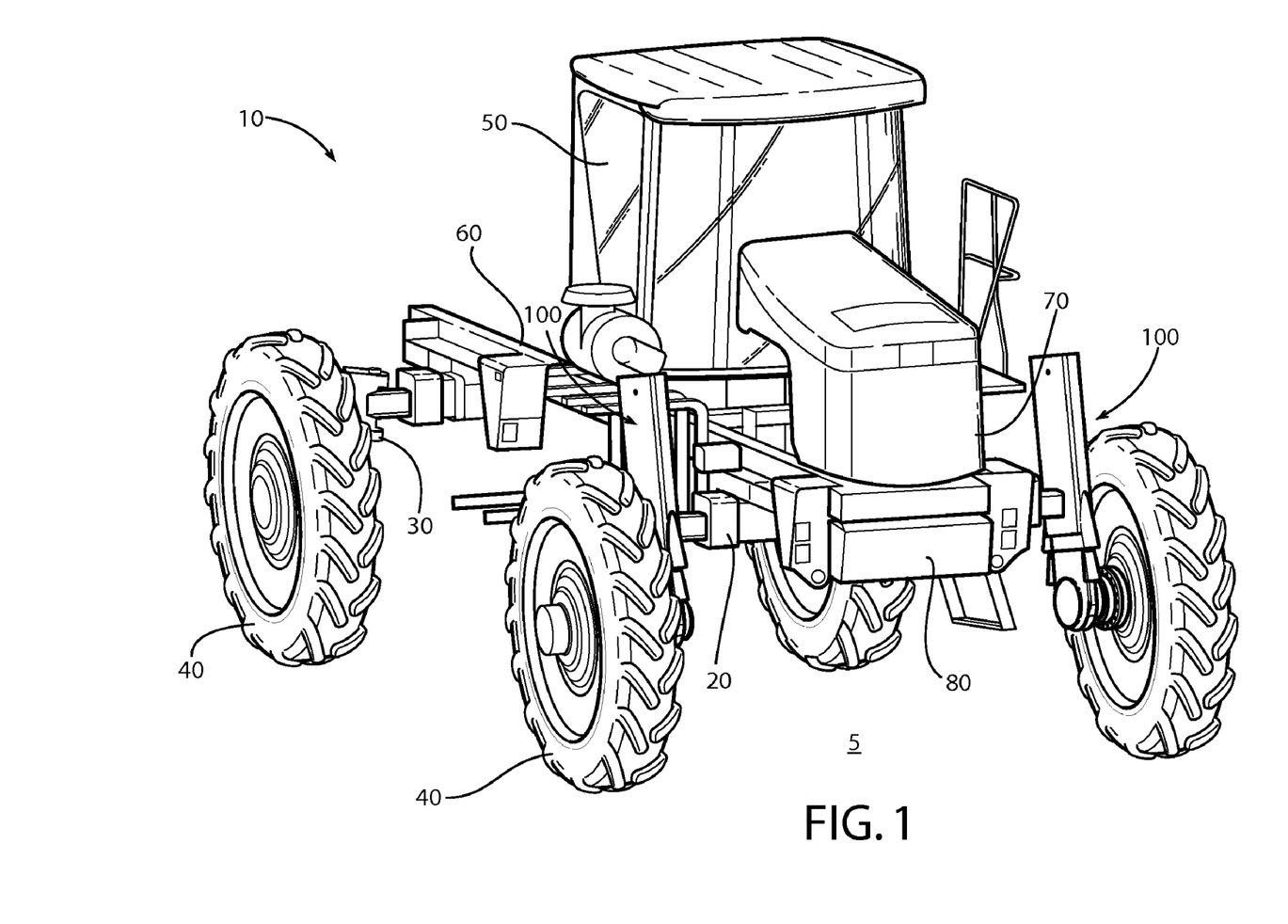
FIG. 1 shows a perspective view of an example embodiment of a variable chassis vehicle having an adjustment apparatus installed thereon.

FIG. 1 shows a perspective view of an example embodiment of an adjustable vehicle 10 having an adjustable ground clearance and height. The vehicle 10 is shown in the form of a mobile sprayer for spraying row crops, such as corn and the like. The vehicle 10 comprises a chassis 20, a conventional rear leg 30, and wheels 40. The chassis 20 serves as a frame for the vehicle 10 and the leg 30 connects the chassis 20 to the wheels 40. The vehicle 10 can also include a cab 50 for an operator to sit in and control the vehicle 10, a frame 60 for carrying the cab 50 atop the chassis 20, and a motor 70 for operating the vehicle 10. Optionally, the vehicle 10 can carry a spraying mechanism 80 for providing a spray material, such as a pesticide or fungicide, to a crop.

Figure 2:
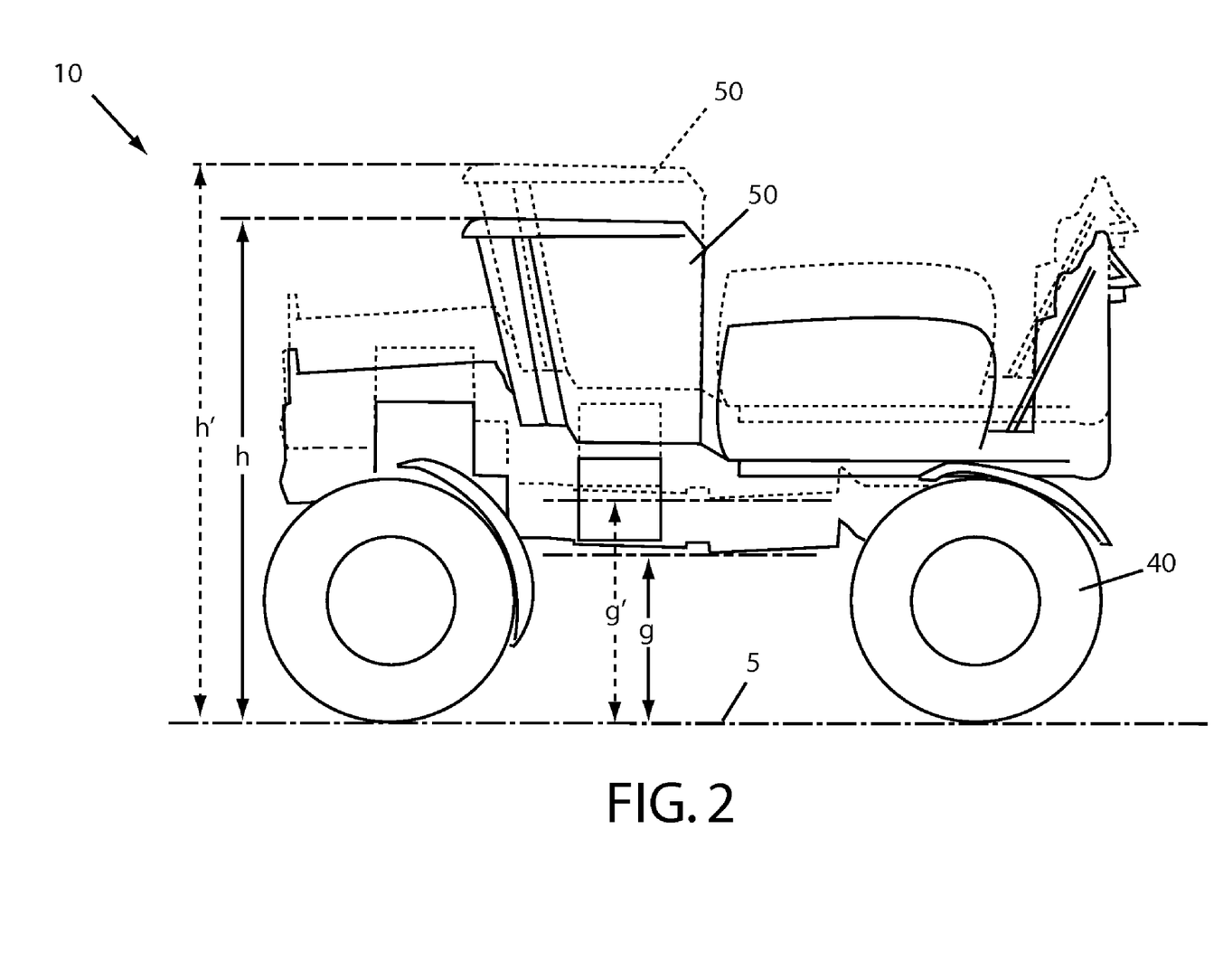
FIG. 2 shows a side view of an example embodiment of a variable chassis vehicle in which the vehicle is adjusted from a first condition shown in solid lines to a second condition shown in dashed lines.

As shown in FIG. 1, an adjustment apparatus 100, or adjustment assembly, may be used in lieu of a conventional leg 30 of the vehicle 10. The adjustment apparatus 100 is adapted to enable the chassis 20 to be dynamic and variably adjustable, rather than static. For example, the adjustment apparatus 100 may be adapted to move the chassis 20 up and down with respect to a surface 5. By being able to move up and down, the overall height h of the vehicle 10 and the distance g between the chassis 20 and the surface 5, (also referred to herein as the ground clearance), can be altered as shown in FIG. 2. Additionally, the adjustment system 100 can perform as a suspension system, dampening the effects of the terrain with respect to the cab 50 and could be used as part of a steering system.

As shown in FIGS. 3A-D and FIG. 4, the adjustment apparatus 100 can be coupled to both the chassis 20 and the wheel 40 of the vehicle 10. For purposes of illustration, a conventional connection between the chassis 20 and the wheel 40 is illustrated in FIG. 1 at the left rear wheel 40 which employs a conventional static leg 30. In such an arrangement the distance from the surface 5 to the chassis 20 (the ground clearance) would be generally fixed. That is, in vehicles that use the conventional leg 30, the chassis 20 remains a constant distance from the surface 5 and the height of the vehicle remains constant. The adjustment apparatus 100 may be provided to a vehicle 10 to effectuate an adjustable ground clearance and height for the vehicle 10. The adjustment apparatus 100 may be provided at one, some, or all of the wheels 40.

Figure 3A:
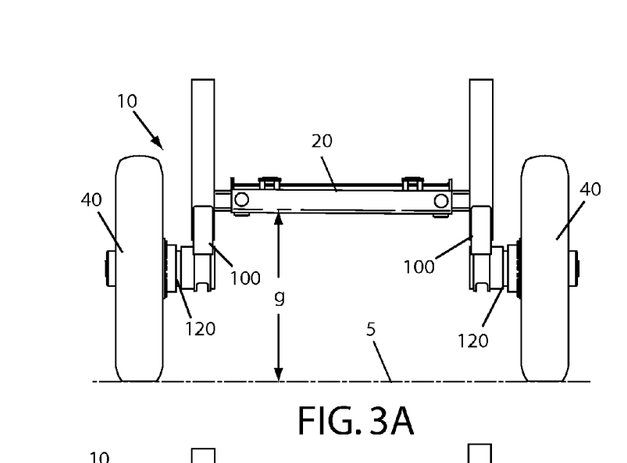
FIG. 3A shows example embodiments of a variable chassis vehicle having an initial ground clearance.
Figure 3B:
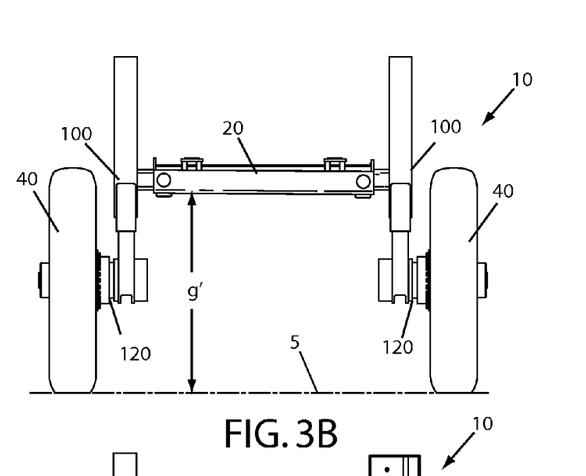
FIG. 3B shows an example embodiment of the variable chassis vehicle of FIG. 3A adjusted to a new ground clearance.
Figure 3C:
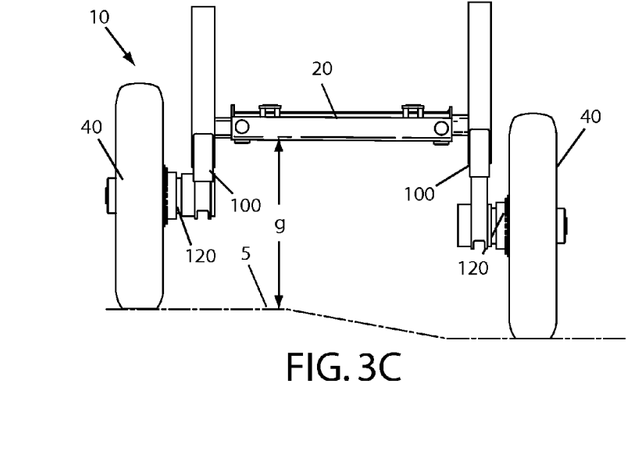
FIG. 3C shows an example embodiment of the variable chassis vehicle of FIG. 3A is which the vehicle is adjusted to unlevel ground.
Figure 3D:
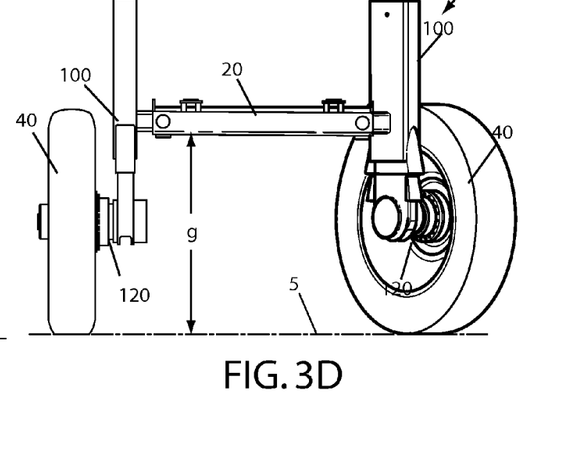
FIG. 3D shows an example embodiment of the variable chassis vehicle of FIG. 3A adjusted in which an adjustment apparatus is provided on a steering assembly.

The adjustment apparatus 100 allows the chassis 20 of the vehicle 10 to ascend and descend with respect to the surface 5, so that the distance g from the surface 5 to the chassis 20 (the ground clearance) is variable and may be altered as desired. This allows the ground clearance of the vehicle 10 to be changed from an initial value g (shown in FIGS. 2, 3A and 4 in solid lines) to a second value g' (shown in solid line in FIG. 3B and in FIGS. 2 and 4 in dashed lines) and allows the vehicle 10 to be readily adapted to the height of the crop to be sprayed. As shown in FIG. 3C an adjustment apparatus 100 could be used at opposing wheels and adjusted at different heights g and g' to adjust the vehicle to uneven terrain. As seen in FIG. 3D, an adjustment apparatus 100 may be provided on a steering assembly (not shown). In an example embodiment, the adjustment system 100 can provide 24 inches more distance between the chassis 20 and the surface 5 than the conventional, static leg 30. Likewise, the adjustment apparatus 100 can be used to change the overall height h of the vehicle from a first initial height h to a second height h'. In an example embodiment, the adjustment system 100 can increase the height h by 24 inches from a minimum height. It should be noted that the amount of lift adjustment range is limited only by the limitations or needs of the vehicle clearance and is not limited by the invention.

Figure 4:
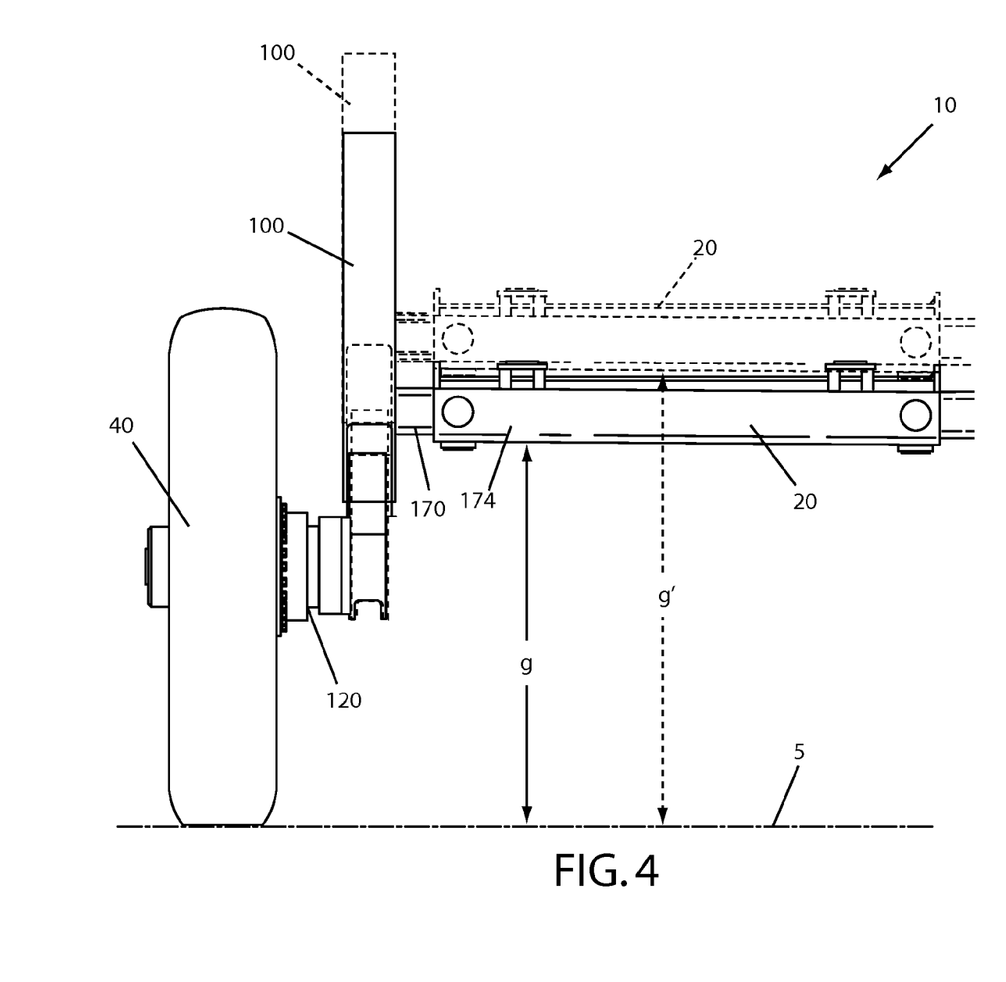
FIG. 4 shows an example embodiment of an adjustment apparatus adjusting the ground clearance from a first height shown in solid lines to a second height shown in dashed lines.
Figure 5:
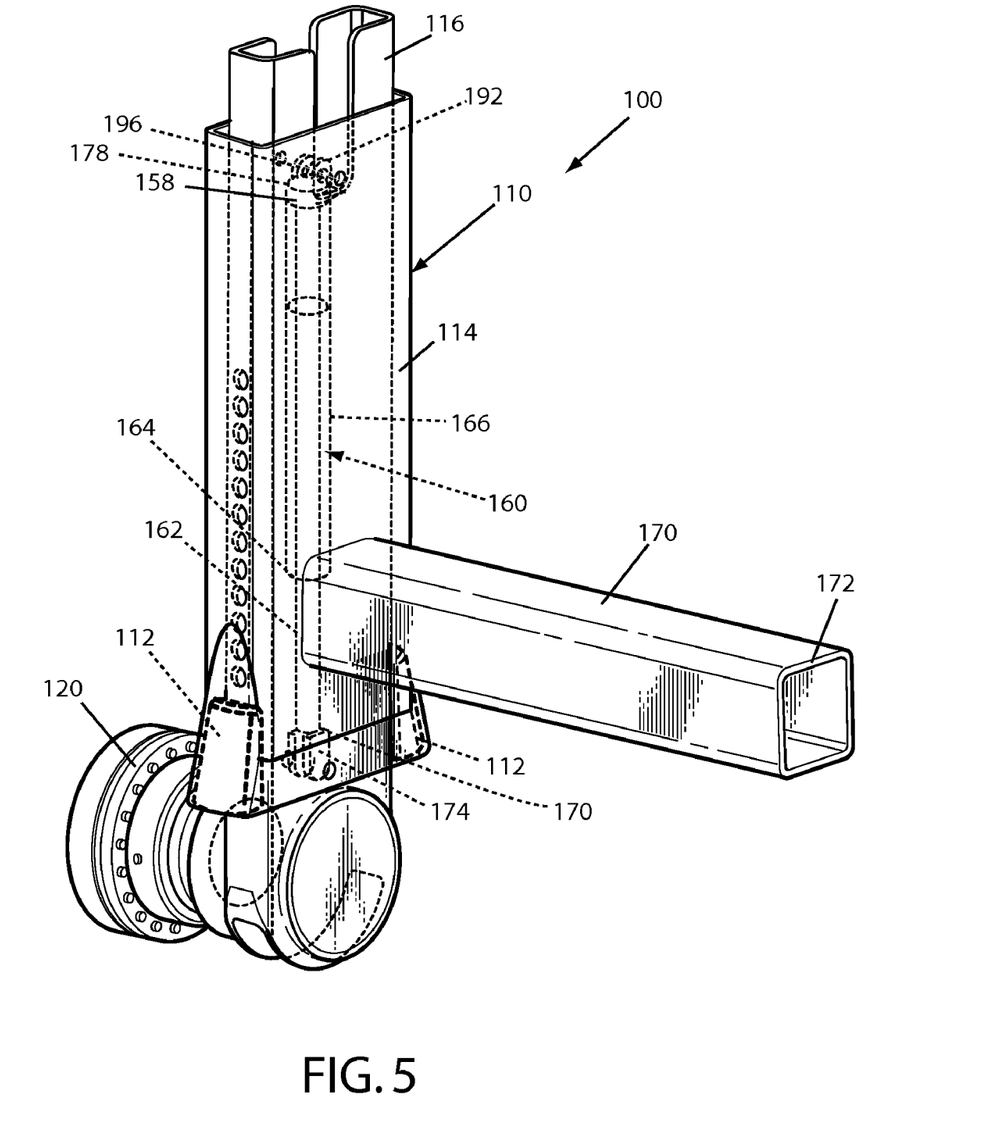
FIG. 5 shows a perspective view of an example embodiment of an adjustable apparatus for use in adjusting the ground clearance of a vehicle.

FIG. 5 shows an example embodiment of an adjustment apparatus 100 that includes an adjustable leg 110 and a stop 112 (dashed lines) for fixing the adjustable leg 110 in a desired condition. The adjustable leg 110 may include a main leg 114 and a drop leg 116 that is movable with respect to the main leg 114. The main leg 114 may be configured to attach to the chassis 20 of a vehicle 10 and the drop leg 116 configured to couple to a drive assembly 128 of the vehicle, which in turn is coupled to a wheel 140 of the vehicle 10 (as best shown in FIG. 4). The adjustable leg 110 may be extended and retracted to position the chassis 20 relative to the wheel 40 to change the ground clearance of the vehicle 10 and the vehicle's overall height. The stop 112 may be configured to releasably engage the adjustable leg 110 to temporarily fix the vehicle at a desired height and/or ground clearance. The removable stop 112 may be removed, the adjustable leg 110 adjusted to a new condition, and the removable stop 112 inserted to lock the vehicle 10 at a new height and/or ground clearance as desired.

Figure 6:
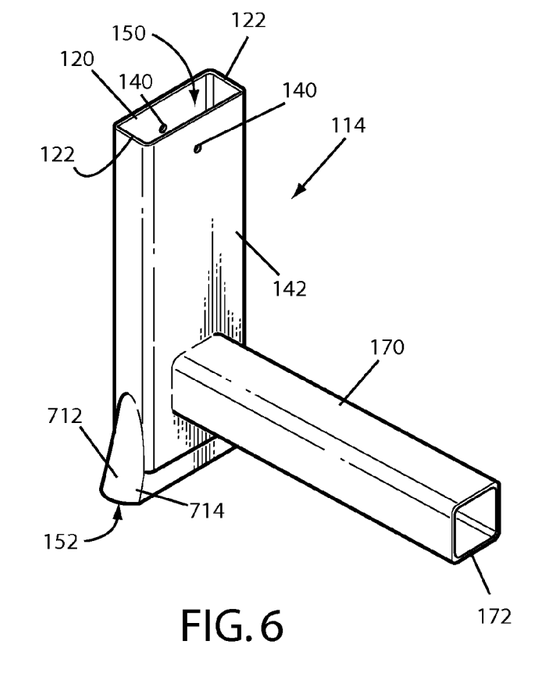
FIG. 6 shows an example embodiment of a main leg for use in an adjustable leg of an adjustment apparatus.

As best seen in FIG. 6, the main leg 114 may comprise a hollow generally rectangular housing 142 having opposing major 120 and minor 122 sidewalls such that the interiors define a receiving space 150 for receiving the drop leg 116 as described in more detail below. A skirt 712 having a generally curved outer wall 714 may be provided at the lower portion of the minor sidewall 122 so that the area between the curved outer wall 714 and the minor sidewalls 122 defines a receiving pocket 152 for receiving and engaging the removable stop 112 that may be inserted into the drop leg 116 as discussed in more detail below. Mounting holes 140 may be provided in the major sidewalls 120 to receive fasteners (not shown) for coupling a power mechanism, such as a hydraulic cylinder 160, to the main leg 114. A support member 170 may extend generally perpendicular to the housing 142 from a major sidewall 120, the support member 170 configured to coupled with the chassis 20 of the vehicle 10 as shown in FIG. 4. For example, the support member 170 may have a generally rectangular cross section and an end 172 that is designed to be inserted and coupled to a horizontal chassis cross bar 174 that forms a portion of the chassis 120. In this example, support member 170 slides into the chassis cross bar 174. This allows support member 170 to be positioned at various locations to provide varying wheel position 40 for different row spacing widths. The apparatus could also be installed on a fixed wheel track axle, where wheel leg 100 could be directly attached to the chassis cross bar 174. This would still provide for adjustable vehicle height without an adjustable wheel track. In the case of a steerable axle, wheel leg 100 could be attached to member 170 with a pivot pin to allow member 170 to be pivoted with a hydraulic cylinder to steer the chassis. This couples the main leg 114 to the chassis 120 such that vertical movement of the main leg 114 results in vertical movement of the chassis 120.

Figure 7:
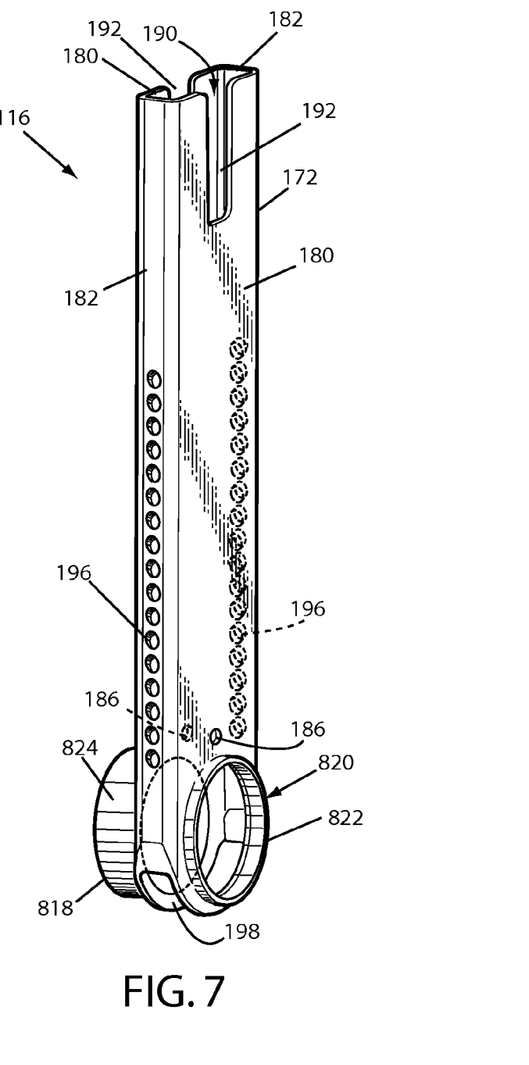
FIG. 7 shows an example embodiment of a drop leg for use in conjunction with the main leg shown in FIG. 6.
Figure 8:
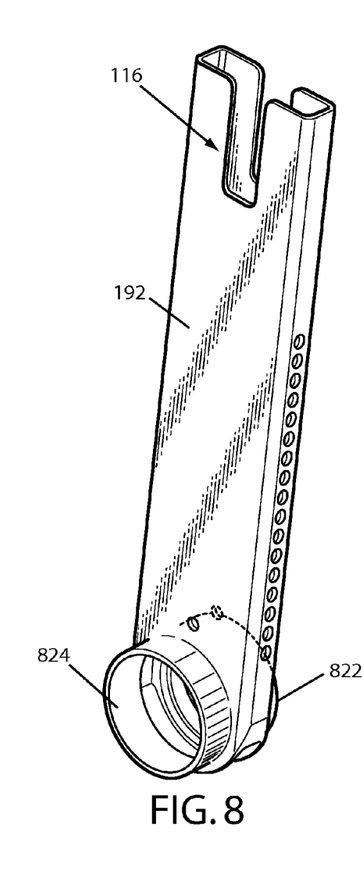
FIG. 8 shows an example embodiment of a drop leg configured for mounting a drive assembly thereon.
Figure 9:
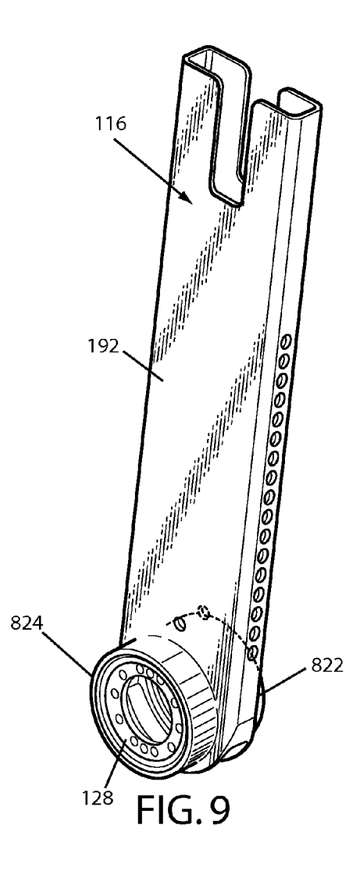
FIG. 9 shows an example embodiment of the drop leg of FIG. 8 in which a portion of a drive assembly is mounted.
Figure 10:
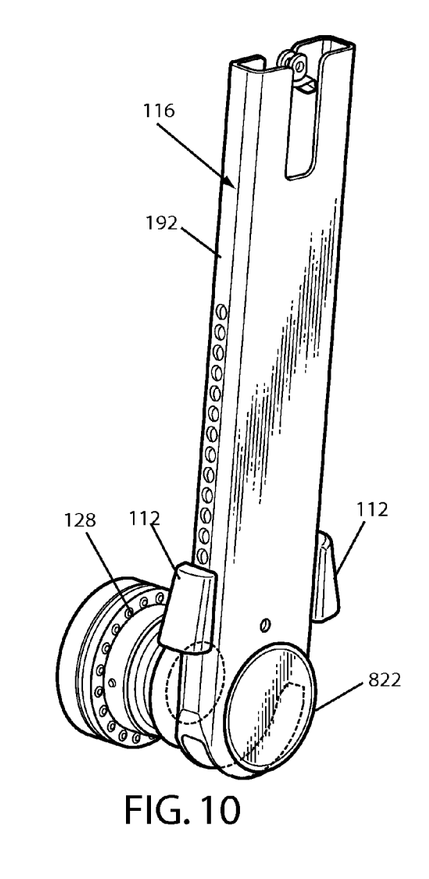
FIG. 10 shows an example embodiment of FIG. 8 in which a drive assembly is mounted thereon.

FIG. 7 shows an example embodiment of a drop leg 116. The drop leg 116 may include a housing 172 having a generally rectangular shape with opposing major 180 and minor 182 sidewalls. The drop leg housing 142 may be configured such that when the drop leg 116 is placed within the housing 142 of the main leg 114, the major 120 and minor 122 sidewalls of the drop leg housing 142 are proximate the major 120 and minor 122 sidewalls of the housing 142 of the main leg 114 so that the major leg 114 serves as a sleeve for the drop leg 116. As seen in FIG. 5, the drop leg 116 may have a length so as to extend through the open ends of the main leg 114. The sidewalls 180, 182 of the drop leg housing 142 may define an interior receiving space 190 for housing the hydraulic cylinder 160 or other power mechanism.

Slots 192 may be provided at the upper end of the major sidewalls 180 to allow space for a fastener (not shown) to couple the hydraulic cylinder 160 to the main leg major sidewall 180. For example, a hydraulic cylinder 160 may be mounted to the main leg 114 by a fastener (not shown) that extends through apertures 140 in the major sidewalls 122 of the main leg housing 142. As the drop leg 116 moves relative the main leg 114, the fastener may move within the slots 192. Similarly, apertures 186 may be at lower end of the major sidewalls 186 to receive fasteners (not shown) for coupling a power mechanism, such as the hydraulic cylinder 160 to the drop leg 116. In that case, the hydraulic cylinder 160 may be attached at a top end to the housing 142 of the main leg 114 and attached at a bottom end to the housing 172 of the drop leg 116. As shown in FIG. 7, a plurality of apertures 196 may be provided in the minor sidewalls 182 of the drop leg housing 172. The apertures 196 may be sized to receive a protrusion 102 of the removable stop 112 (FIG. 11) as discussed in more detail below.

The drop leg 116 may include a mount 820 for a drive assembly 128. For example, as shown in FIGS. 7-10 an open-ended cylinder 818 provided in a lower portion of the drop leg 116 that provides major 824 and minor 822 circular flanges that extend laterally outward from the drop leg housing 192 and are adapted to receive a radial piston hydraulic motor 830, or some other rotational drive component such as a gear box or electric motor, which may be attached to a wheel 140 of a vehicle. The drive assembly 128 may be powered as known in the art to drive the wheel 140, such as by a hydrostatic pump (not shown). A slot 198 may be provided to allow access to the wheel motor mounting bolts and fittings (not shown) for assembly.

Figure 11:
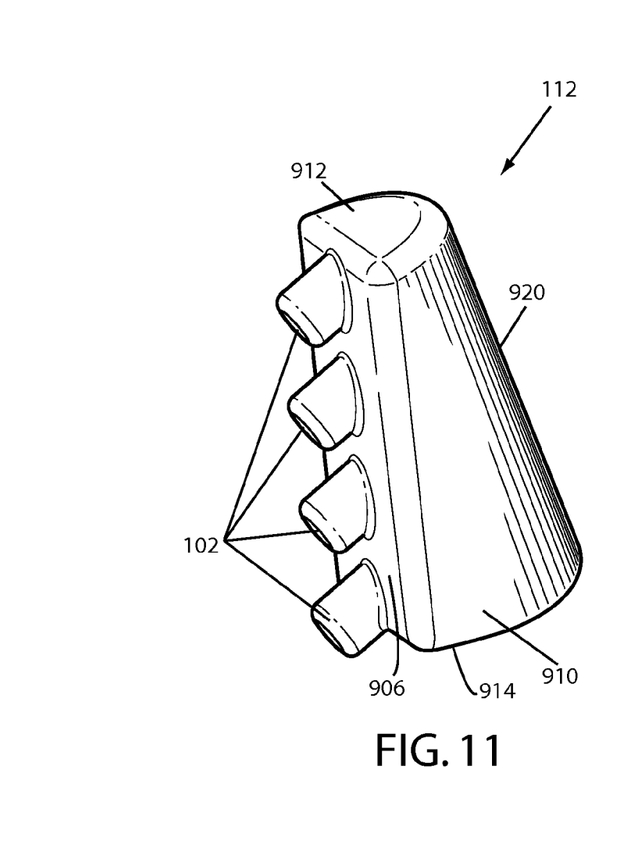
FIG. 11 shows an example embodiment of a removable stop for use with an adjustable leg of an adjustment apparatus.
Figure 12:
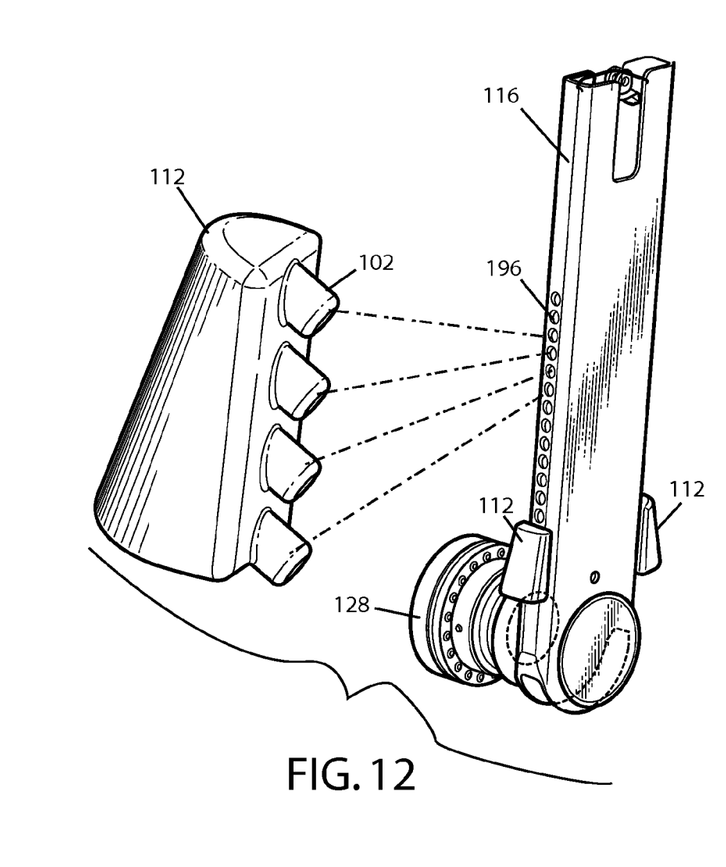
FIG. 12 shows an example embodiment of a removable stop of FIG. 11 and how the removable stop may engage a drop leg of an adjustment apparatus.

FIG. 11 shows an example embodiment of the removable stop 112 having a wedge-shaped or generally partial-cone shaped body 910 with a plurality of protrusions 102. The body 910 may have a generally planar sidewall 906 for abutting the minor sidewall 182 of the drop leg 116 and a curved outer sidewall 920 for engaging a complementary inner surface of the outer wall 714 of the skirt 712 of the main leg 114 when the removable stop 112 is received in the receiving pocket 152 of the main leg 114. The body 910 has a partial-cone shape with a flat top 912 and a bottom 914 and planar side wall 906. The weight of the machine applied to the tapered wedge retains the drop leg 116 in the main leg 114 in both fore/aft and side to side position preventing looseness and twisting in the wheel leg joint. The protrusions 102 may have a generally circular cross section configured for insertion into the apertures 196 of the drop leg 116 as shown in FIG. 12. The protrusions 102 may angle downward to assist in holding the removable stop 112 within the apertures 196. In an example embodiment, the removable stop 112 is made of steel or cast iron. The tapered shape of surface 920 and 712 is shown as a curved radius, but similar results could be achieved with tow angled surfaces in a diamond shape instead of a curved radius. The angled protrusions 102 also allow a user to easily remove the wedge by moving the wedge upward so the protrusions 102 can exit the apertures 196. When a downward force is applied to the stop 112, such as when the main leg 114 engages the stop 112 a clamping force is provided that helps keep the stop 112 coupled to the drop leg 116.

A power mechanism may also be provided to assist in the adjustment of the main leg 114 and the drop leg 116. In an example embodiment shown in FIG. 5, a power mechanism is provided in the form of the hydraulic cylinder 160 that includes a piston 158, a piston rod 162, and a hydraulic chamber 166. The hydraulic cylinder 160 may be connected to a power source such as a hydraulic pressure pump (not shown). The hydraulic cylinder 160 can cause the adjustable leg 100 to extend or contract, thereby increasing or decreasing the distance between the chassis 20 and the surface 5 (the ground clearance) and increasing the height of the vehicle accordingly.

A first end 168 of the piston rod 162 may extend from a bottom cap 164 of the chamber 166 and be fixed to the major sidewalls 180 of the drop leg 116. For example, a fastener (not shown) may extend through a clevis 174 provided on the end 168 of the piston rod 162 and apertures 186 provided on the drop leg major sidewalls 180. A second end 178 of the piston rod 240 may be attached to a piston 158 housed within the hydraulic chamber 166 so that the piston 158 and piston rod 162 may be moved by pressurized hydraulic fluid provided by the power source. A clevis 192 may be provided at a head 196 of the cylinder 160 and coupled to the major sidewalls 180 of the main leg by fasteners (not shown) extending through the clevis 192 and apertures 140.

In operation, the hydraulic fluid within the chamber 166 can be increased or decreased. As the fluid in the chamber 166 increases, the pressure pushes downwardly on the piston 158 and pushes more of the piston rod 240 out of the chamber 166, and thus extends the drop leg 116 from the main leg 114. Consequently, the chassis 20 of the vehicle moves up and down with respect to the wheel 40 depending on the amount of hydraulic fluid that is contained in the chamber 250. In an example embodiment, this can extend the length of distance between the chassis 20 and the surface 5 and increase the ground clearance and height of the vehicle 10. Likewise, as the fluid decreases, the drop leg 116 retracts within the main leg 114 and as a result, the ground clearance of the vehicle can be decreased. As discussed above, a removable stop 112 may be used to prevent the retraction of the drop leg 116 within the main leg 114 when the stop 112 is installed.

Figures 13A, 13B:
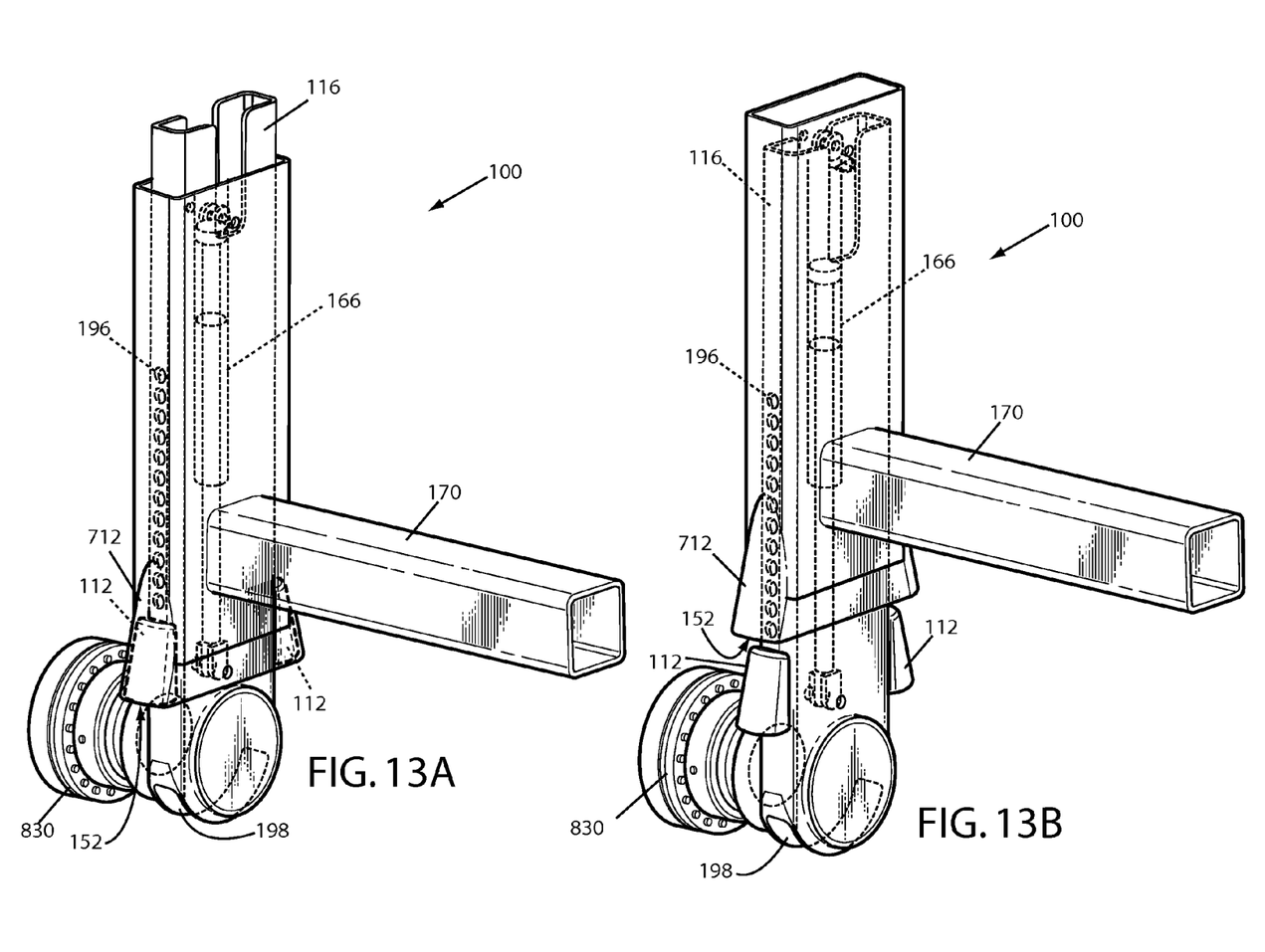
FIG. 13A shows an adjustment apparatus in an initial condition for providing an initial ground clearance for a vehicle in which a removable stop is installed at a first position.
FIG. 13B shows an example embodiment in which the adjustment apparatus has been moved to a new condition with the removable stop accessible.

FIGS. 13A-13D show an example operation of the adjustable leg 100. In FIG. 13A, the drop leg 116 is positioned within the main leg 114 so that the vehicle 10 is at a minimum ground clearance. The removable stop 112 is positioned in the lowest apertures 196 of the drop leg 116 and is engaging by the receiving pockets 152 of the main leg 114. The stop 112 prevents the further retraction (upward movement in FIG. 13A) of the drop leg 116 into the main leg 114. The weight of the cab 50 and other portions of the vehicle supported by the chassis 20 provide a clamping force to the stop 112 through the receiving pocket 152 of the main leg 114. The initial arrangement shown in FIG. 13A may be useful to place vehicle 10 at an overall height that is suitable for transport on public roads and/or for spraying short crops such as early season cotton, soybeans, wheat, and the like.

In FIG. 13B, the chassis 20 has been raised with respect to the wheel 40 and the drop leg 116 is extended downward from the main leg 114. It should be noted that while the hydraulic cylinder 160 discussed above could be used to assist in raising the chassis 20 relative the wheel 40, other means could be used, such as, by way of example and not limitation, electric actuators, or an external method such as a crane. The position in FIG. 13B provides greater ground clearance for the vehicle 10 from the initial condition shown in FIG. 13A and increases its overall height of the vehicle 10. This arrangement may be suitable for spraying taller crops such as mature corn than the initial arrangement of the FIG. 13A.

Figure 13C:
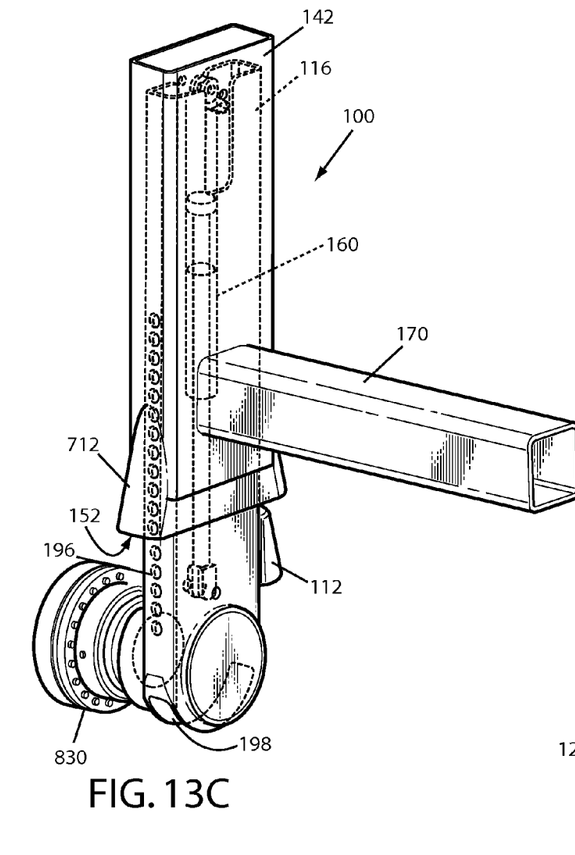
FIG. 13C shows the adjustment apparatus of FIG. 13B in which the removable stop has been removed.

With the drop leg 116 in FIG. 13B extended from the main leg 114 the removable stop 112 is exposed and accessible by an operator. The removable stop 112 may thus be removed from its initial position in FIG. 13B and inserted into new apertures 196 located higher up on the drop leg 116 to fix the drop leg in the extended position (FIG. 13C). The force used to move the chassis, whether from the hydraulic cylinder 160 or other means may then be removed if desired so that the main leg 114 rests on the drop leg 116 by virtue of the removable stop 112. Again the weight of the chassis 20 and cab 50 applied to the removable stop 112 by the main leg 114 provides a clamping force to help keep the removable stop 112 installed in the drop leg. A power mechanism, such as the hydraulic cylinder 160 may also be used to provide additional force to clamp the arrangement together.

Figure 13D:
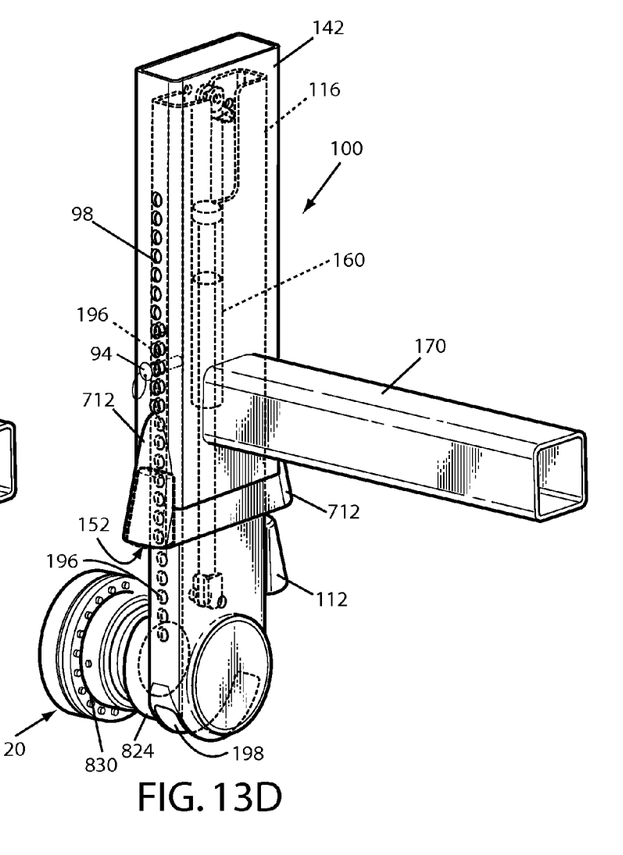
FIG. 13D shows the adjustment apparatus of FIG. 13C in which a removable stop has been installed at a second position.

A retaining pin may also be used to lock the adjustable leg 110 into a desired condition. For example, in addition to the apertures 96 in the drop leg 116, corresponding apertures 98 may be provided in the main leg 114 so that the apertures 96 of the drop leg may be aligned with the apertures 98 in the main leg 114. With the apertures 96, 98 aligned, the shaft of a pin 94 may be inserted therethrough to fix the relative position of the drop leg 116 and the main leg 114 (FIG. 13D). This allows for the condition of the adjustable leg 110 to be fixed from movement in both directions, i.e., preventing the extension and retraction of the adjustable leg. The pin may also be removable as well to allow for the further adjustment of the adjustable leg 110 as desired.

As previously mentioned, the removable stop allows for the extension of the adjustable leg 110 while preventing the leg's 110 retraction. Thus, when the adjustable leg 100 is in the extended condition with the removable stop 112 in place, an operator can extend the adjustable leg 110 to raise the vehicle 10 and thereby increase the vehicle's ground clearance while operating in the field and thereby adjust the height for obstacles or varying terrain. For example, an operator may extend the adjustable leg from an initial condition to a second condition and insert a removable stop 112 to prevent retraction of the adjustable leg 110 the lowering of the vehicle 10. An obstacle requiring a greater ground clearance may be encountered and the operator may further extend the leg 110 to a third condition, such as by way of the hydraulic cylinder 160, to increase ground clearance and avoid the obstacle. Once the obstacle is cleared, the operator may lower the vehicle to the second condition, such as by retracting the drop leg 116 using the hydraulic cylinder 160. When the operator is finished working the filed, the removable stop 112 may be removed and the adjustable leg 110 returned to the initial condition. If desired, the operator may then insert a retaining pin 94 through the retaining pin aperture 98 in the main leg 114 and an aperture 196 in the drop leg 116 to fix the drop leg 116 relative the main leg 114, such as in the second or third condition discussed above.

While the invention has been disclosed in its preferred forms, it will be apparent to those skilled in the art that many modifications, additions, and deletions can be made therein without departing from the spirit and scope of the invention and its equivalents, as set forth in the following claims.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. An adjustable vehicle having variable ground clearance, said vehicle comprising:
   a chassis;
   a wheel;
   an adjustable leg configured to couple said chassis to the wheel of the vehicle, the adjustable leg comprising a main leg coupled to the chassis and a drop leg coupled to the wheel of the vehicle, the drop leg movable with respect to the main leg for varying the ground clearance of the chassis over a surface of the ground, wherein one of the main leg or the drop leg comprises a tapered receiving pocket and the other of the main leg or the drop leg has a plurality of ground clearance-selecting apertures formed therein; and
   a removable stop for fixing the main leg with respect to the drop leg, the removable stop having a tapered portion and at least one protrusion, wherein the removable stop is positioned with said protrusion in a selected one of said plurality of apertures and received in the receiving pocket of the adjustable leg such that the tapered portion interacts with the tapered receiving pocket to prevent contraction of the adjustable leg and to force said protrusion into said one of the plurality of apertures while allowing extension of the adjustable leg.

2. The apparatus of claim 1, wherein the removable stop comprises a wedge-shaped body having said at least one protrusion for insertion into one of the ground-selecting apertures of the adjustable leg.

3. The apparatus of claim 1, wherein said main leg has at least one pin-receiving aperture, the drop leg has at least one aperture, the at least one pin-receiving aperture configured for alignment with the at least one aperture of the drop leg to allow a retaining pin to be inserted through the pin-receiving aperture and the aperture of the drop leg to fix the drop leg relative to the main leg.

4. The apparatus of claim 1 further comprising a power mechanism for adjusting movement of the drop leg with respect to the main leg to cause the adjustable leg to extend and contract.

\* \* \* \* \*